（12） United States Patent
Austel et al.

(10) Patent No.: US 9,189,649 B2
(45) Date of Patent: Nov. 17, 2015

(54) SECURITY MODEL FOR WORKFLOWS AGGREGATING THIRD PARTY SECURE SERVICES (75) Inventors: Paula K Austel, Cortlandt Manor, NY (US); Suresh Chari, Scarsdale, NY (US); Francisco Curbera, South Salem, NY (US); Matthew J. Duftler, Mahopac, NY (US); Rania Y. Khalaf, Cambridge, MA (US); Florian F. Rosenberg, Canberra (AU)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 12/823,200

(22) Filed: Jun. 25, 2010

(65) Prior Publication Data

US 2011/0321131 A1  Dec. 29, 2011

(51) Int. Cl.
| H04L 29/06 | (2006.01) |
| G06F 7/04 | (2006.01) |
| G06F 15/16 | (2006.01) |
| G06F 17/30 | (2006.01) |
| G06F 21/62 | (2013.01) |
| G06F 21/33 | (2013.01) |
| G06F 9/44 | (2006.01) |
| G06Q 10/06 | (2012.01) |
| G06Q 10/10 | (2012.01) |
| H04L 12/24 | (2006.01) |
| H04L 29/08 | (2006.01) |

(52) U.S. Cl.
CPC ............ G06F 21/6236 (2013.01); G06F 21/33 (2013.01); G06F 8/10 (2013.01); G06F 8/34 (2013.01); G06F 2221/2115 (2013.01); G06Q 10/06 (2013.01); G06Q 10/06316 (2013.01); G06Q 10/10 (2013.01); H04L 41/046 (2013.01); H04L 67/10 (2013.01)

(58) Field of Classification Search
CPC .................................................... H04L 63/0815
USPC ......................................................... 726/4–6
See application file for complete search history.

(56) References Cited

U.S. PATENT DOCUMENTS

2008/0282318 A1 * 11/2008 Rits .................................. 726/1
2009/0144628 A1 6/2009 Stevens et al. ................ 715/733

(Continued)

OTHER PUBLICATIONS

Bussard, L, Nano, A, Pinsdor, U; "Delegation of access rights in multi-domain service compositions"; Dec. 1, 2009; Springer Netherlands; Identity in the Information Society; vol. 2 Issue 2; p. 137-154.*

(Continued)

Primary Examiner — Alexander Lagor
(74) Attorney, Agent, or Firm — Ido Tuchman; Preston J. Young (57) ABSTRACT A method, system and computer program product for security model for workflows aggregating third party secure services. In one embodiment, a workflow model described in a workflow language is provided and configured to declare security requirements of a composite application integrating protected data from two or more external network resources. The method also incorporates providing an authentication service executing on at least one secure server computer. The authentication service is configured to conduct user authentication and authorization to access the protected data at the external network resources on behalf of the composite application executing on at least one host server computer according to the workflow language.

19 Claims, 7 Drawing Sheets

(56) References Cited

U.S. PATENT DOCUMENTS

| | | | |
|---|---|---|---|
| 2010/0114941 A1 | 5/2010 | Von Kaenel et al. | 707/769 |
| 2010/0131412 A1 | 5/2010 | Bradley et al. | 705/59 |

OTHER PUBLICATIONS

Curbera, F, Khalaf, R, Lovell, D, Kramer, B, Lin, K, Narasimhan, P; "Bite: Workflow Composition for the Web"; Sep. 20, 2007; ICSOC '07, p. 94-106.*

F. Rosenberg, R. Khalaf, M. Duftler, F. Curbera, P. Austel (2009). End-to-End Security for Enterprise Mashups. In: Proceedings of the 7th International Joint Conference on Service Oriented Computing (ICSOC'09), Nov. 23-27, 2009, Stockholm, Sweden.*

Bussard, L., Di Nitto, E., Nano, A., Nano, O., & Ripa, G. (2008). An approach to identity management for service centric systems. In Towards a Service-Based Internet (pp. 254-265). Springer Berlin Heidelberg.*

PCT Application No. PCT/US11/27747 International Search Report and Written Opinion, pp. 1-9.

Laurent Bussard et al., An Approach to Identity Management for Service Centric Systems First European Conference ServiceWave 2008 Madrid, Spain, Dec. 2008, p. 254-265.

Florian Rosenberg et al., End-to-End Secutiry for Enterprise Mashups, 7th International Joint Conference, ICSOC-ServiceWave 2009, Stockholm, Sweden, Nov. 24-27, 2009. Proceedings, <http://www.florianrosenberg.com/papers/icsoc2009.pdf>.

* cited by examiner

```
1  <process name =" hiring ">
2      < receivePOST name =" hrInput " url ="/ hiring " />
3
4      <! -- get Google calendar data -->
5      <GET name =" gcal " url=" http: // www . google . com/ calendar / feeds /default /
              owncalendars / full ">
6          <control source =" hrInput " />
7          <input name =""></ input >
8          <input name =""></ input >
9          <security authtype =" oauth " />
10     </GET >
11
12     <replyPOST name =" hrReply " url ="/ hiring ">
13         <control source =" gcal " />
14         <input value =""/>
15     </ replyPOST >
16
17     <! -- invoke interview scheduling service -->
18     <POST name =" scheduleInterview " url=" http: // internal . acme . com / interview /
              schedule ">
19         <control source =" gcal " />
20         <input name =""></ input >
21         <input name =""></ input >
22         <security authtype =" http_basic " notificationType =" sametime "
                  notificationReceiver ="$ :hrInput_User " />
23     </ POST >
24
25     <! -- send an email to the candidate and collect candidate data using a
              special form activity -->
26
27     <! -- put all the collected candidate data on the Lotus file share -->
28     <shareFile name =" storeApplication " ... >
29         <control source =" collectCandidateData "/>
30         <! -- other parameter cut for brevity -->
31         <security user ="$ :hrInput_User " authtype =" app_id ">
32             <mapping >
33                 <element name ="par" label =" Partner ID" applyTo =" param " />
34                 <element name ="key" label =" License Key" applyTo =" param " />
35             </ mapping >
36         </ security >
37     </ shareFile >
38 </ process >
```

```
1 <security authtype =" http_basic | oauth | app_id "
2          user =" string | expression "?
3          roles =" string (comma - separated )"?
4          notification =" http | email | sametime "?
5          notificationReceiver =" string | expression "?
6          scope =" activity | flow "? />
```

SECURITY MODEL FOR WORKFLOWS AGGREGATING THIRD PARTY SECURE SERVICES

BACKGROUND

Various embodiments described herein relate generally to systems, and more specifically to a security model for workflows aggregating third party secure services.

Mashups are a method of creating new web applications combining content, presentation, and application functionality from disparate Web sources. These include "mashing" together several services and sources such as REST or SOAP services, feeds (RSS or ATOM) or plain XML or HTML sources.

Two different types of mashups are currently dominant, consumer mashups and enterprise mashups. Consumer mashups are mostly for private use, combining data from several resources by unifying them using a common interface. Enterprise mashups combine different sources from at least one resource in an enterprise environment. Enterprise mashups have enormous potential by promoting assembly over development to reduce development costs and provision a new solution within shorter time periods.

SUMMARY

An example embodiment of the present invention is a method for accessing data. The method includes receiving a workflow model described in a workflow language. The workflow model is configured to declare security requirements of a composite application integrating protected data from two or more external network resources. The method also incorporates executing an authentication service on at least one secure server computer. The authentication service is configured to conduct user authentication and authorization to access the protected data at the external network resources on behalf of the composite application executing on at least one host server computer according to the workflow language.

A further example embodiment of the present invention includes a system for accessing data. The system includes a workflow model described in a workflow language. The workflow model is configured to declare security requirements of a composite application integrating protected data from two or more external network resources. The system also includes an authentication service executing on at least one secure server computer. The authentication service is configured to conduct user authentication and authorization to access the protected data at the external network resources on behalf of the composite application executing on at least one host server computer according to the workflow language.

Yet a further example embodiment of the invention is a computer program product for accessing data. The computer program product includes receiving a workflow model described in a workflow language. The workflow model is configured to declare security requirements of a composite application integrating protected data from two or more external network resources. The computer program product also contains code configured to issue a request to an authentication service executing on at least one secure server computer to perform user authentication and authorization to access the protected data at the external network resources on behalf of the composite application according to the workflow language.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is an example workflow model listing from the example scenario in FIG. 3.

DETAILED DESCRIPTION

The present invention is described with reference to embodiments of the invention. Throughout the description of the invention reference is made to FIGS. 1-7B.

Aspects of the invention relate to a security model for mashups aggregating third party secure services. Current enterprise mashup tools lack the ability to consume and integrate different services in a mashup in a secure way when having completely diverse security requirements in terms of authentication and authorization. As a consequence, many mashup tools can only integrate security-free services and data sources or hard-code authentication data in the mashup code. This is a problem in enterprise environments because users are more reluctant to give their authentication information to third parties (in fact, company policy may even prohibit that), resources typically have custom security requirements. Furthermore, aggregated secure services require different credentials from different users over different protocols. Resources may support any of several authentication protocols such as HTTP basic authentication, custom application keys or more Web 2.0 like protocols such as OpenID and OAuth.

Embodiments of the present invention provide support for enterprise mashups that allow a user to aggregate data from both secure and unsecure resources on a network, with each secured resource potentially utilizing a different security protocol.

Figure 1:
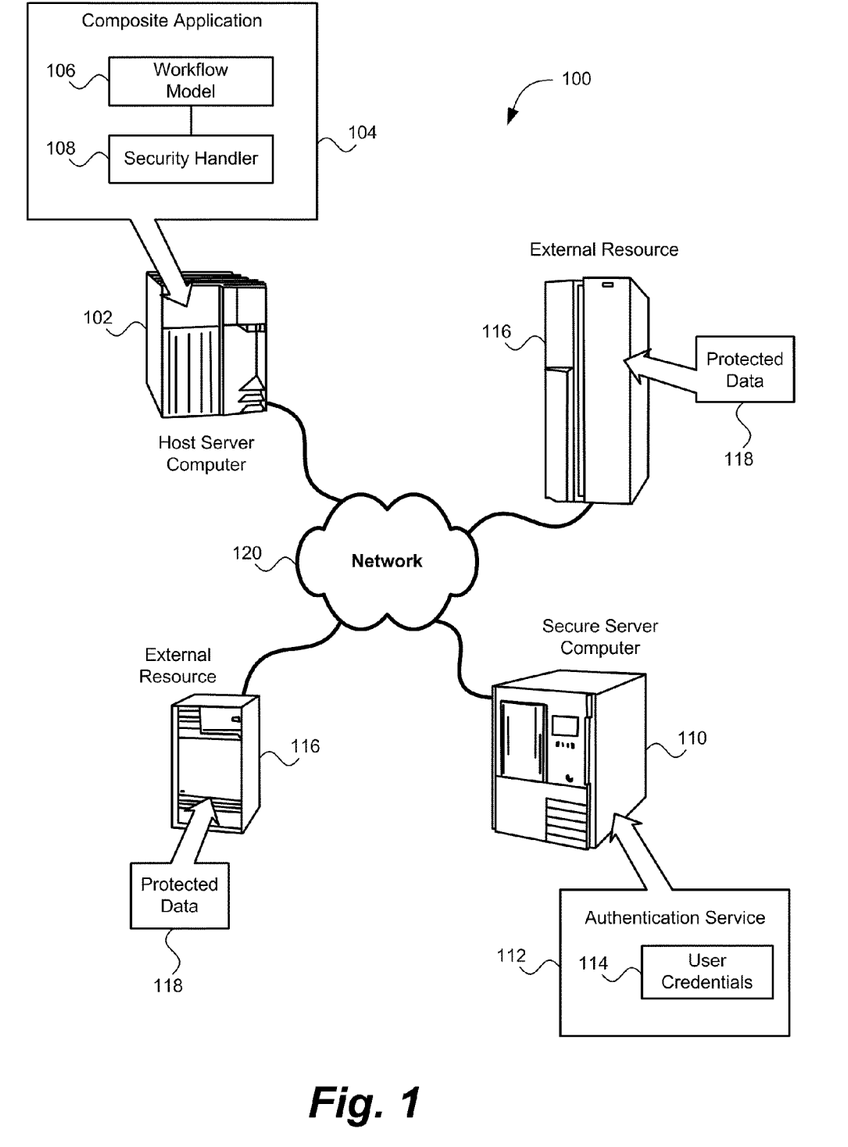
FIG. 1 illustrates an example system for accessing data, as contemplated by the present invention.

FIG. 1 illustrates an example system 100 for accessing data, as contemplated by the present invention. It is noted that the system 100 shown is just one example of various arrangements of the present invention and should not be interpreted as limiting the invention to any particular configuration.

In one embodiment, the system 100 includes a host server computer 102 and a secure server computer 110. Running on the host server computer 102 is a composite application 104. A workflow model 106 described in a workflow language is configured to declare security requirements of the composite application 104 integrating protected data 118 from two or more external resources 116. Thus, workflows are a way to represent/materialize and execute mashups.

The composite application 104, which may run on the host server computer 102 may include the workflow model 106. The composite application 104 may be written in a compiled or interpretive language including the workflow language. The workflow language may be a compiled or interpretive language that may include an XML based language including Bite or an extended version of the Bite language. For more information about the Bite language, the reader is referred to Francisco Curbera, Matthew Duftler, Rania Khalaf, Douglas Lovell, *Bite: Workflow Composition for the Web, International Conference on Service Oriented Computing (ICSOC 2007)*, Springer LNCS, Vienna, Austria, Sep. 17-20, 2007. Further embodiments of the composite application 104 include a security handler 108. The security handler 108 may be a module in the composite application 104 that interacts with an authentication service 112. The security handler 108 may interact with the authentication service 112 over a number of authentication protocols including, but not limited to, OAuth, HTTP Basic Authentication, and AppID to provide support for different security mechanisms at the target service.

In an embodiment of the invention, the composite application 104 contains at least one workflow instance of the workflow model 106. The workflow may be written in the workflow language. In an embodiment of the present invention, the workflow instance maintains its state of execution when the composite application 104 communicates with the authentication service 112.

The secure server 110 must be located in a trusted environment that is protected by authentication and access control rules. Running on the secure server computer 110 is the authentication service 112. The authentication service 112 is configured to conduct user authentication and authorization to access the protected data 118 on the external resources 116 on behalf of the composite application 104. The external resources 116 include any resources available on an external computer, either secured or unsecured. The protected data 118 includes feeds such as RSS or Atom, services such as REST or SOAP, HTML or XML sources, or computer accessible files such as images or documents.

In one embodiment, user credentials 114 are stored within the authentication service 112. The user credentials 114 may include passwords, usernames, or tokens storing identifying information.

The host server computer 102 is connected to the secure server computer 110 over a network 120. The network 120 may be any of various types of networks known in the art, including local area networks (LANs), wide area networks (WANs), wired and/or wireless networks. The network 120 may employ various configurations known in the art, including by example and without limitation TCP/IP, Wi-Fi®, Bluetooth® piconets, token ring, optical and microwave. Wi-Fi is a registered trademark of the Wi-Fi Alliance, located in Austin, Tex. Bluetooth is a registered trademark of Bluetooth SIG, Inc., located in Bellevue, Wash.

Figure 2:
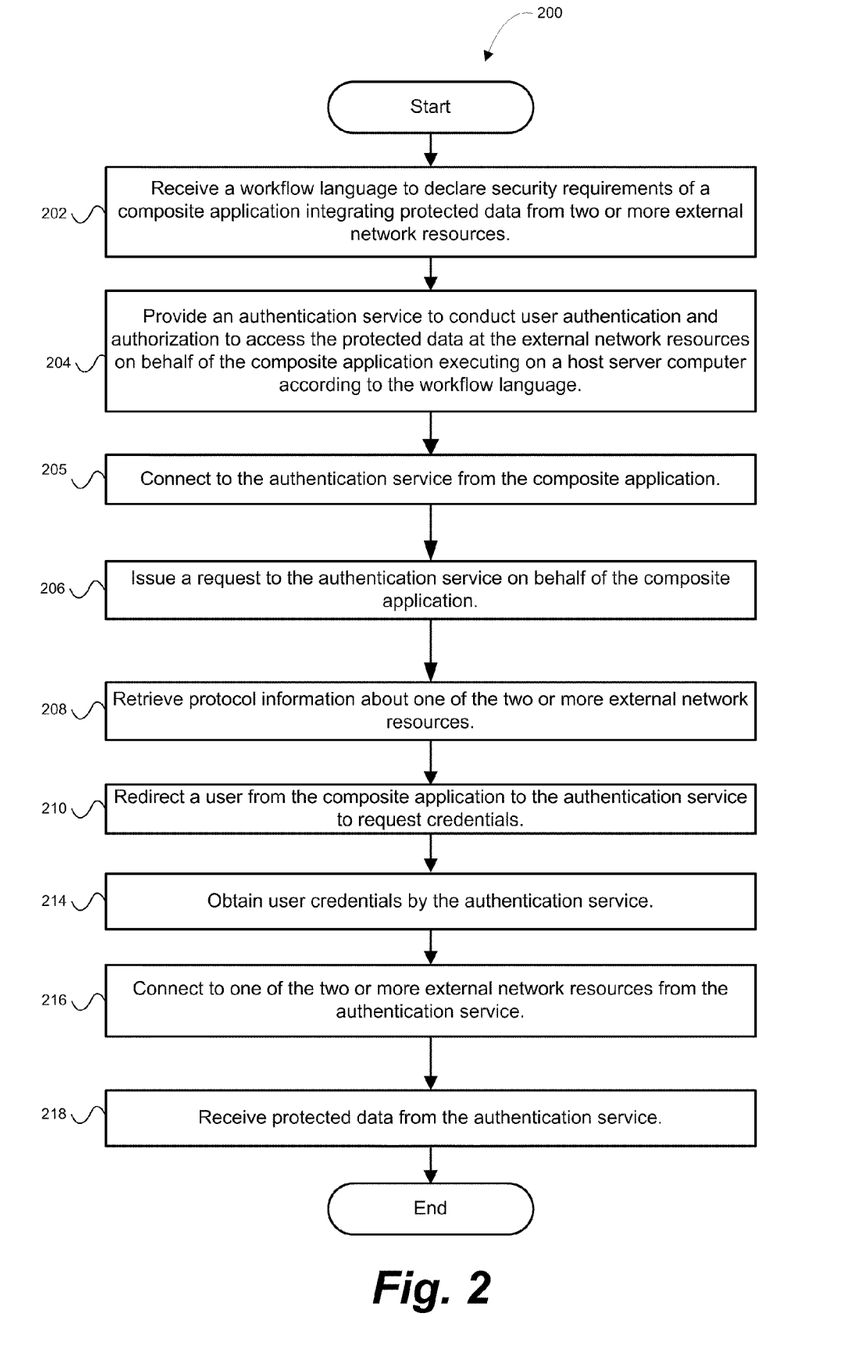
FIG. 2 shows an example flowchart of the method for accessing data, as contemplated by the present invention.

FIG. 2 shows an example flowchart 200 of a method for accessing data, as contemplated by the present invention. Each workflow activity may do operations 204-218, if it requires security. That is, the operations may be performed if the workflow activity has a security element on it and it is outbound. The method begins at Block 202 and includes receiving a workflow language to declare security requirements of a composite application integrating protected data from two or more external network resources. Declaring security requirements may include using a security extension element in the workflow language.

At Block 204, the method includes providing an authentication service to conduct user authentication and authorization to access the protected data at the external network resources on behalf of the composite application executing on a host server computer according to the workflow language.

The method further includes, at Block 205, connecting to the authentication service from the composite application. This may be accomplished through the use of common security protocols, such as the OAuth protocol.

OAuth is a well-understood and increasingly popular protocol for Web based applications and it implements a seamless way of handling authentication and authorization between a consumer and a provider. The consumer in this scenario is the Bite engine and the provider is the SAS itself. An OAuth provider has to provide three different request URLs: (1) a request token URL (relative URL/request token); (2) a user authorization URL (/authorize); and (3) an access token URL (/access token). A typical OAuth authentication and authorization is handled as follows: First, a consumer requests a request token using the request token URL (1) by sending a number of OAuth specific parameters, such a pre-negotiated consumer key to identify the consumer application, timestamp, nonce, signature etc. In case all parameters are correct and verifiable, the service provider issues an unauthorized request token. When the request token is received by the consumer, the user's browser can be redirected to the service provider to obtain authentication and authorization. This authorization ensures that the user sitting behind the browser explicitly ensures that the consumer Web application is allowed to access the service provider's resources on its behalf. Once the authorization is performed, the service provider can redirect the user back to the consumer application (using a callback URL). Finally, the consumer has to exchange the request token for an access token at the service provider. This is typically granted if the user successfully performed the authentication and authorization in the previous step. This access token is one of the OAuth parameters that has to be sent with every further request to the protected service (among others such as consumer key, timestamp, signature, etc).

The method includes, at Block 206, issuing a request to the authentication service on behalf of the composite application. This request may be issued when the composite application needs data held on a third party resource. Furthermore, this data may be protected. The request may be issued through the use of a security handler module in the composite application.

At Block 208, the method includes retrieving protocol information about one of the two or more external network resources. Protocol information may be retrieved by requesting protocol information from the external resource or by hard coding security information into a security handler module or in the authentication service.

At Block 210, the method includes redirecting a user from the composite application to the authentication service to request credentials. This step varies depending on the protocol. If the protocol is Http Basic Authentication or AppID then the SAS displays a form to collect the user credentials and stores these credentials securely at the SAS. If the protocol for the 3rd party service is OAuth then the SAS does the OAuth protocol with the 3rd party service and the user will be redirected to the 3rd party service by the SAS so that the user credentials are only entered at the 3rd party service and are never stored in SAS.

Block 210 may further include redirecting a user that is currently interacting with the composite application by redirecting the user's browser to a web page of the authentication service. In an embodiment of the present invention this may be accomplished by contacting the user through an asynchronous messaging service if the user is not currently connected to the composite application. The asynchronous messaging service may include, for example, electronic mail, an instant message, or a mobile phone text message.

Transparently supporting a secure authentication and authorization of different third-party services through the SAS's OAuth interface requires extending the OAuth protocol. This allows the SAS to act as a "secure proxy" for various other authentication protocols. To do so, the SAS needs at least the URL and the authentication type of the target service. Since this information is available in the activity specification and the security extension in a Bite flow (e.g., FIG. 4, lines 18-23), it just needs to be sent to the SAS to enable transparent third-party service authentication. Thus, a number of request parameters are added when the Bite engine requests a request token at the SAS.

At Block 214 the method includes obtaining user credentials by the authentication service. This may be accomplished by redirecting users to the third-party service to ask for credentials. However, as mentioned above, if the protocol for the 3rd party service is OAuth then the SAS does the OAuth protocol with the 3rd party service and the user will be redirected to the 3rd party service by the SAS so that the user credentials are only entered at the 3rd party service and are never stored in SAS.

At Block 216, the method provides for connecting to one of the two or more external network resources from the authentication service. The authentication service may have the user credentials and may follow the mechanisms of the particular security protocol or protocols used by the third party resource. Additionally, at Block 218, the method includes receiving protected data from the authentication service. The authentication service may act as an intermediate for data as well as security.

Figure 3:
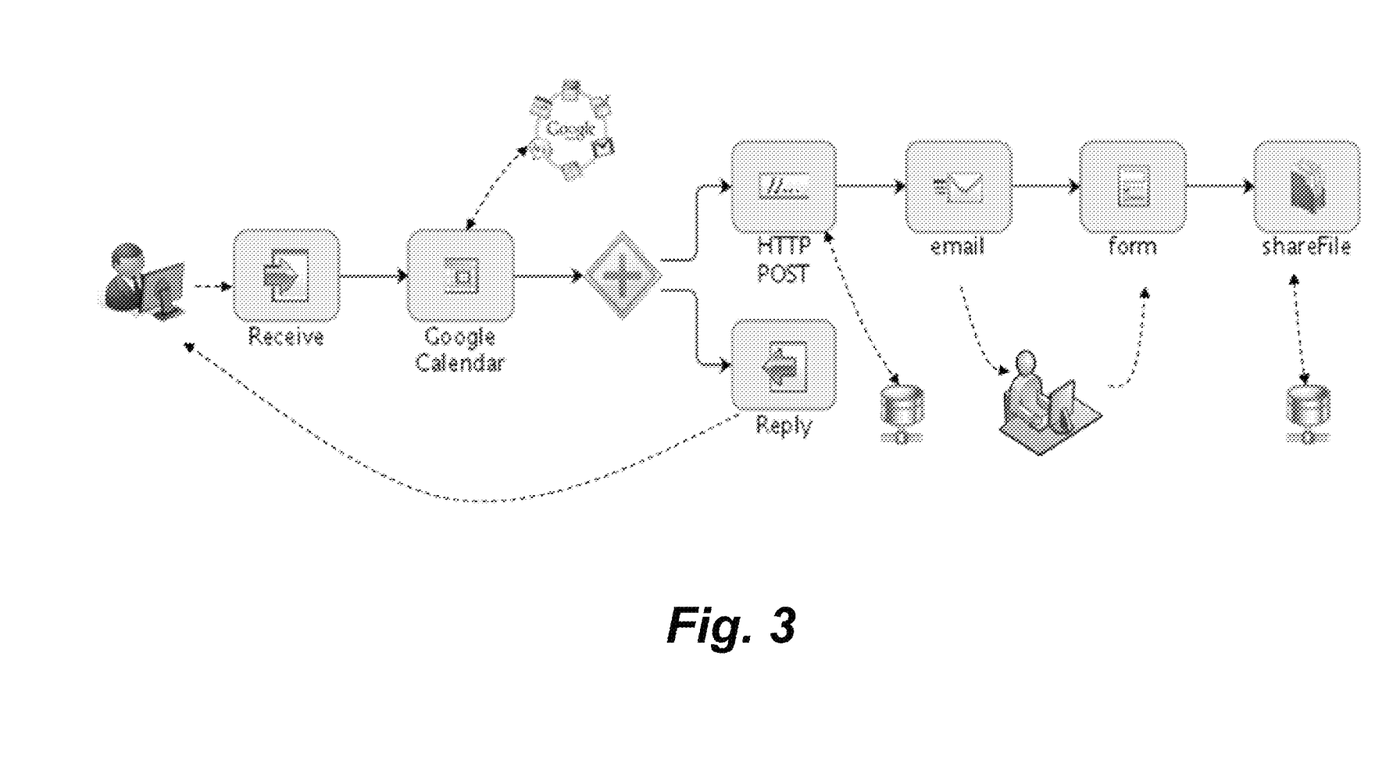
FIG. 3 shows an example scenario of the use of the system and method for accessing data, as contemplated by the present invention.

FIG. 3 shows an example scenario of the use of the system and method for accessing data, as contemplated by the present invention. An enterprise mashup scenario is used to illustrate the problem and concepts. In this scenario, the hiring manager at Acme Inc (left) is hiring for a new position. He uses the enterprise mashup to schedule the interview with and get the resume of the candidate (bottom right). In order to do so, the mashup first makes a call to the hiring manager's calendar available via Google calendar. Then it forks. The bottom branch replies to the initial call and the top branch posts the available times to Acme's interview scheduling service, e-mails the candidate the final slot returned by that service and a link that should be followed to complete the process. Once the candidate clicks on the link, he finds a form where he fills in his personal information and attaches his resume. Finally, the mashup places the resume in the 'Files' file sharing service in LotusLive Engage, an online collaboration solution.

Interacting with multiple secured third-party services requires different sets of credentials and authentication protocols. For example, Google Calendar uses the OAuth protocol, Acme's scheduling service uses HTTP basic authentication, and the Files service requires an application key and the user in whose store the file is to be added. The Google Calendar call and the Files service call both require that the mashup interact with them on the user's behalf—possibly after the user is no longer logged into the system.

FIG. 4 is an example workflow model listing from the example scenario in FIG. 3. The Business Mashup Platform (BMP) provides a hosted development environment for rapid development of situational business processes or enterprise mashups. The graphical mashup development is browser-based, leveraging a BPMN-style editor, a forms designer and a catalog of extension activities that are offered to the designer in a palette. Once a mashup has been completely specified, BMP allows one click deployment of mashups that are immediately invokable. In the backend, Bite code is generated and executed on the server.

Bite is an XML-based REST-centric composition language designed to facilitate the implementation of lightweight and extensible workflows. The process model implements a subset of the WS-BPEL execution semantics that consists of a flat graph (except for loops) containing atomic actions (activities) and links between them. Loops may be created using a dedicated while loop activity, the only construct allowed to contain other activities. Graph execution logic is encoded in conditional transition links between activities. Error handling is provided by special error links to error handling activities. Bite provides a small set of built-in activities: (1) basic HTTP communication primitives for receiving and replying to HTTP requests (receiveGET|POST, replyGET|POST, receive-replyGET|POST) and making HTTP requests to external services (GET, POST, PUT, DELETE), (2) utility activities for waiting or calling local code, (3) control helpers such as external choice and loops.

A Bite workflow both calls external services and provides itself as a service. Sending an HTTP POST request to a workflow's base URL results in the creation of a new workflow instance that is assigned a new instance URL. This instance URL is returned in the HTTP Location header field of the response. The instance URL contains a workflow ID that is used for correlation of subsequent requests to that workflow.

Each workflow instance can define multiple receive activities corresponding to multiple entry points. These activities expose additional URLs as logical addresses of the instance's nested resources. POST requests directed to these URLs are dispatched to the individual receive activities in the workflow model using the relative URLs defined in the activities' url attribute. This mechanism allows building interactive workflows having multiple entry points for interacting with the workflow. This behavior is leveraged by various activities such as Web forms that are designed as part of the mashup creation with Business Mashup Platform (BMP).

A concept of Bite is the extensible design that enables the developer community to provide additional functionality in a first-class manner by creating Bite extension activities and registering them with the Bite engine. This design allows keeping the language and its runtime very small and allows developers to implement other required activities as extensions. Extension activities can be created using Java or any scripting language supported by the Java Scripting API (e.g., Groovy, Ruby, Python, etc).

FIG. 4 shows the (abbreviated) Bite code for the hiring sample in FIG. 3. Each mashup has a root element called process (line 1). A new workflow instance is created by sending a HTTP POST request to the relative URL/hiring of the initial receivePOST (line 2). The data associated with the POST request is implicitly available in variable hrInput, which is output to all dependent activities. In this case the variable contains a map of all POST parameters. After completing the hrInput activity, the gcal activity is activated (lines 5-10). Transitions between activities are expressed by the control element (line 6). From lines 12-15, the mashup replies to the initial HTTP POST from the hiring manager informing him that he will receive an email with the selected interview date. The interview scheduling is executed in lines 18-23 by issuing a HTTP POST call to the interview scheduling service. Then, the other remaining steps are executed, e.g., sending an email using the sendMail activity and preparing the candidate form using the form activity—both implemented as Bite extension activities (not shown in the listing for brevity). Finally, the shareFile extension activity (lines 28-37) uploads the collected candidate data to LotusLive.

The outgoing HTTP GET and POST call (gcal and scheduleInterview) and the shareFile activity require different security credentials that are required for successfully executing the mashup.

Figure 5:
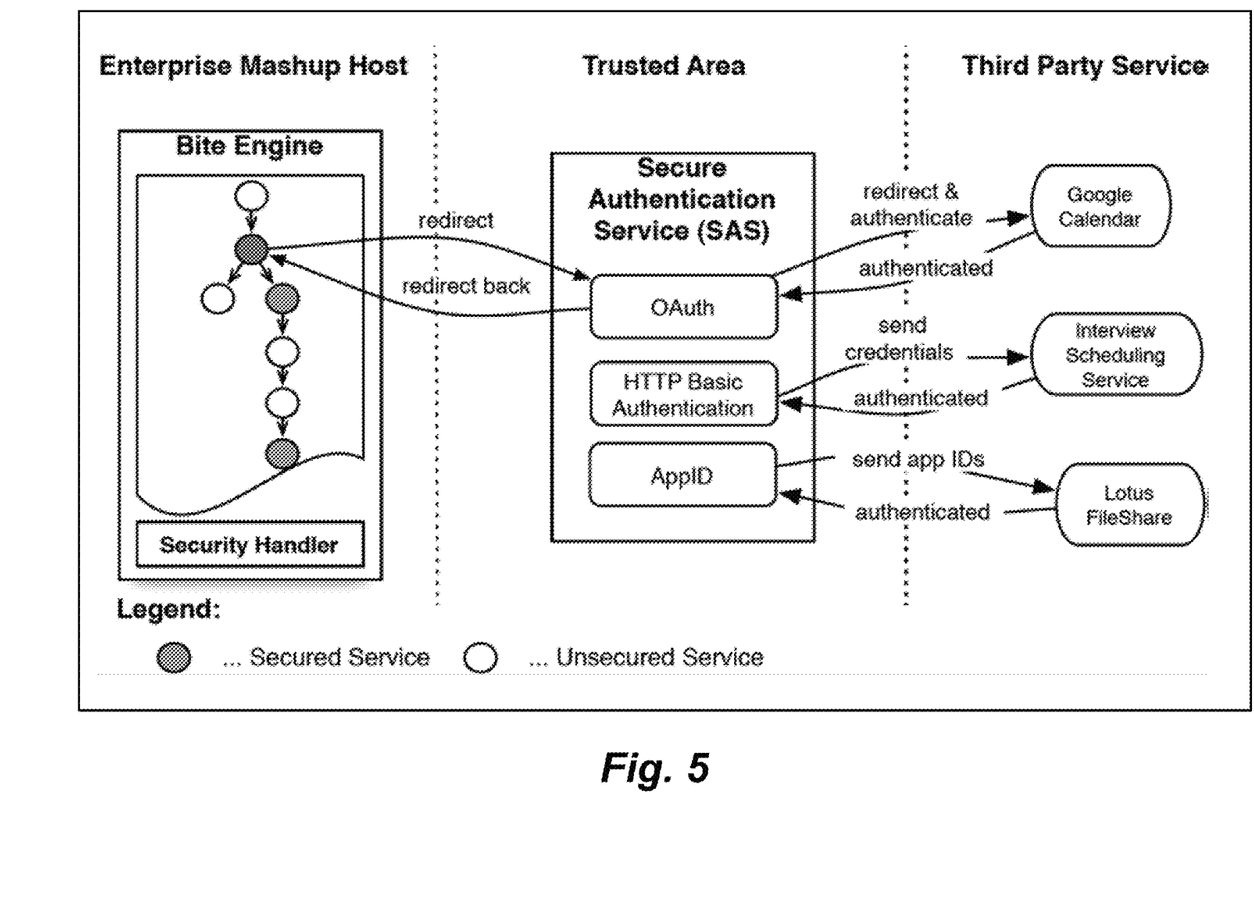
FIG. 5 is an overview of security solutions implementing the example embodiment of the present invention as shown in FIG. 3.

FIG. 5 is an overview of security solutions implementing the example embodiment of the present invention as described in FIG. 3. As detailed below, the SAS allows multiple users to interact with the mashup and the mashup to access the services on behalf of each user.

To provide security into an enterprise mashup platform the following is addressed: (i) authentication of users at third-party services (i.e., verifying a user's claimed identity) and (ii) authorization in the sense that the user has to authorize the Bite engine to perform the task on the user's behalf. In addition, two aspects are distinguished. First, security may be addressed on a language level to integrate security concerns into the Bite language. It may be advantageous to keep the language extensions minimal and provide extensibility support for various authentication protocols in a seamless user-centric way. Second, an extensible mechanism is beneficial to realize authentication and authorization of trusted services having different authentication protocols. This process is transparently handled by a Secure Authentication Service (SAS) that offers an OAuth interface.

In FIG. 5, the basic overview of the security solution is depicted. The Bite engine including an executable workflow is shown on the left (reassembling the illustrative example from FIG. 3). The white services constitute services which do not require authentication, the gray ones require authentication. In the middle is the SAS which has to operate in a secure and trusted area within the company network as it manages credentials during the execution of a workflow. On the right, the third-party services are depicted that will be invoked during the execution. It is useful to place the SAS in a trusted location. Some options include either at a third-party provider or a SAS at each service provider. Since focus is on enterprise mashups, it is viable that the SAS is a service provided by the enterprise itself making trust issues between users and the proxy infrastructure less of a problem.

When the user triggers the execution of the workflow by using the HTTP POST request in the Web form (or from another application), the mashup is executed and as soon as it reaches the first "secured" third-party service (the gcal activity from FIG. 4), the Bite engine will use a security handler to allow the user to authenticate at the target service. The handler does this by interacting with the SAS. The SAS enables plugging in multiple different security modules, such as OAuth, HTTP Basic Authentication and AppID, to provide support for different security mechanisms at the target service. The procedure for performing authorization and authentication has two cases: Synchronous Authentication and Asynchronous Authentication.

Synchronous Authentication: In this case the user is already interacting with the workflow via a Web application and can thus be simply redirected to the SAS to perform the authentication at the target service. In the workflow, this means that receiveGET|POST has been processed without yet reaching a corresponding replyGET|POST activity. For example, this is the case for the gcal activity from FIG. 4 (lines 5-10) which is in between a receivePOST and a replyPOST.

Asynchronous Authentication: In this case the workflow already returned to the user by executing a replyGET|POST activity. Alternatively, an activity called receive-replyGET|POST is used to receive and immediately reply to an incoming request. Therefore, the user is no longer interacting with the workflow and there is no connection that can be redirected to the SAS. For example, all activities from FIG. 4 after line 18 (namely, scheduleInterview, emailCandidate, collectCandidateData and storeApplication). A possible solution is to contact the user using asynchronous techniques to request him to authenticate at the third-party service. This can be achieved through email and instant messaging.

The communication between the Bite engine and the SAS uses a slightly extended version of the OAuth protocol to seamlessly implement the handling of authentication and authorization between Web applications (in our case the Bite engine and the SAS).

Figure 6:
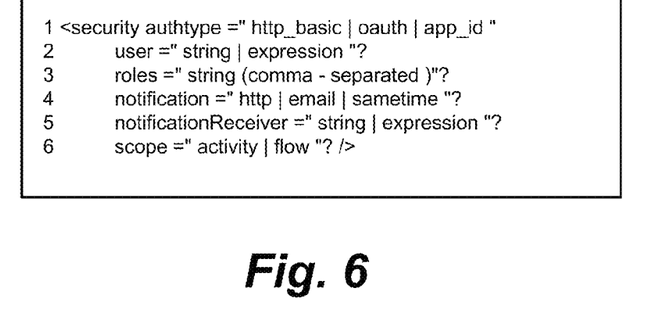
FIG. 6 is an example workflow model listing from the example scenario in FIG. 3 of an example security extension element.

FIG. 6 is an example workflow modellisting from the example scenario in FIG. 3 of an example security extension element. In order to enable security within Bite, the language may be extended to capture the security requirements such as authentication and authorization. A goal may be to keep such language extensions minimal. Authentication and authorization of users that want to execute a mashup is referred to as inbound security. That is, inbound security is the case where a message is sent to the mashup (i.e., the mashup is the secure service in this case). Inbound security is done on a runtime level whereby the user authenticates using OpenID or similar protocols with an external authentication service and the authenticated user is injected into the process context where it can be checked against user restrictions on receiving activities (receiveGET-POST). If the user is allowed to access the receive, the activity activates, stores the message and the user information in the appropriate variables, and completes. Otherwise, an error is sent back to the user and the receive activity is not activated. Note that user information, if provided, for all activities that interact with users is stored at runtime in an implicit variable, [activity name] User. Hence, subsequent activities may use this variable to refer back to a particular user.

To define the security characterstics and requirements of an activity, a security extension element is provided and made optional for all outbound communication activities such as GET, POST, PUT, DELETE and all extension activities implementing custom behavior that may also require authentication.

FIG. 4 has three security elements (lines 9, 22 and 31-36) in the workflow. In FIG. 6, the security element syntax is presented.

Attribute Description: The attributes available for the security element are:

authtype: Specifies the authentication type for authenticating a user at the target service. OAuth, HTTP basic authentication and customized application IDs that are frequently used by various service providers in the form of single or multiple GET or POST parameters are supported. Handling these authentication types is transparently supported by the Secure Authentication Service (SAS).

user: Defines the name of the user (as a string or an expression) on whose behalf a specific service is executed. This user attribute is relevant especially for extension activities that support the "on behalf of" semantics. For example, the hiring workflow from FIG. 4 uses LotusLive to upload and share files. This application supports the "on behalf of" semantics by explicitly defining who uploaded a document indicated by the user attribute in the Bite workflow (this username is then used in LotusLive's file sharing service as the owner of the uploaded document).

roles: Defines roles, that a user can have, in the form of comma-separated strings. If a role is used, role definitions may be provided to the runtime.

notification: The notification defines how a user should be notified that a service requires authentication. In case of a synchronous authentication, http can be used by redirecting to the SAS to request authentication and authorization. In the asynchronous case, the workflow has to get back to the user to request authentication. This can be done by blocking the activity requiring security, sending an email to the user (attribute value email) or use an instant messaging (attribute value sametime) pointing him to the SAS, and resuming the activity once authentication/authorization is complete. One approach uses Lotus Sametime; other protocols may easily be added.

notificationReceiver: This attribute is only needed when using the notification type email or sametime because then it is necessary to have the contact details (e.g., email address or sametime contact). In case of http, it is not necessary, because the user is still interacting with the workflow in the browser and is thus redirected to the SAS to perform the authentication.

scope: The scope defines whether an activity's security credentials are propagated to the other activities for re-use. If the attribute value is workflow, credentials are propagated thereby avoiding repeated logins by re-using credentials to a service that is called more than once in a workflow for the same user. In case of an attribute value activity, the credentials are not propagated.

The effect of the security elements on the execution semantics of the Bite language is as follows: Once an activity that has a security element is reached in a workflow, the values of the security element's attributes are evaluated and stored in a security context, itself stored in the process context which maintains the state of execution for the workflow instance. This information is used to lookup a corresponding security handler in a handler registry. The security context and the message payload are provided to this handler, which interacts with the SAS to provide the required authentication and authorization. If no credentials are available, the handler contacts the user sending them to the SAS. The handler then makes the secure call and returns the result to the activity implementation, which in turn stores it in its output variable. If the scope attribute value is set to activity, the security handler contacts the SAS through its OAuth interface to proceed with the required security handling and the OAuth connection tokens are destroyed after the authentication. If it is set to workflow, these OAuth tokens are stored in the process context and can be reused in case the same service is called again in the workflow for the same user. Reusing the same OAuth tokens for connecting to the SAS allows it to determine whether the user has previously authenticated and authorized Bite to invoke a given third-party service on its behalf.

While the asynchronous case has no further effects on workflow semantics, the synchronous (http) case is more involved because if credentials are not available then it needs to reuse one of the workflow instance's open connections to contact the user, redirecting him to the SAS, and then back to the workflow. Bite allows several receiving activities to be open (i.e., not yet replied to) at the same time. Therefore, the right open connection must be identified. To do so, open receive activities in the workflow instance are checked for a matching 'User' variable value to the one in the security element being handled. The 'reply status' of a matching receive activity is set to 'awaiting redirect' and a key is created for it against which the redirection from the SAS back to the workflow can be matched. A reply is sent to the receive's open connection that redirects the user to the SAS. Once the user completes working with the SAS, a client-side redirect sends him back to the workflow. Also, the matched receive activity instance is found using the key and its reply status reset to 'open'.

If no match is found among open receives, then receives 'awaiting reply' are checked as they will eventually become 'open' and may be used at that time. If no match is found among receives that are open or awaiting-redirect, the user is contacted as in the asynchronous case if contact information is provided in the security element definition. Otherwise, a fault is thrown.

A reply activity for a receive that is 'awaiting redirect' must wait before it can send its response until the receive's reply status is again 'open' and no other security redirects are pending for that receive.

The Secure Authentication Service (SAS) is responsible for providing a proxy that can transparently handle various authentication types of different secure Web-based, e.g., RESTful, services. Therefore, the SAS supports different security mechanisms and exposes itself using an OAuth interface, a popular protocol for managing authentication and authorization among Web-based APIs. The specification defines it as follows: "OAuth protocol enables websites or applications (Consumers) to access Protected Resources from a web service (Service Provider) via an API, without requiring Users to disclose their Service Provider credentials to the Consumers."

OAuth has two advantages for use as the protocol for communicating with the SAS: OAuth is a well-understood and increasingly popular protocol for Web based applications and it implements a seamless way of handling authentication and authorization between a consumer and a provider. The consumer in our scenario is the Bite engine and the provider is the SAS itself. An OAuth provider has to provide three different request URLs: (1) a request token URL (relative URL/request token); (2) a user authorization URL (/authorize); and (3) an access token URL (/access token). A typical OAuth authentication and authorization is handled as follows: First, a consumer requests a request token using the request token URL (1) by sending a number of OAuth specific parameters, such a pre-negotiated consumer key to identify the consumer application, timestamp, nonce, signature etc. In case all parameters are correct and verifiable, the service provider issues an unauthorized request token. When the request token is received by the consumer, the user's browser can be redirected to the service provider to obtain authentication and authorization. This authorization ensures that the user sitting behind the browser explicitly ensures that the consumer Web application is allowed to access the service provider's resources on its behalf. Once the authorization is performed, the service provider can redirect the user back to the consumer application (using a callback URL). Finally, the consumer has to exchange the request token for an access token at the service provider. This is typically granted if the user successfully performed the authentication and authorization in the previous step. This access token is one of the OAuth parameters that may be sent with every further request to the protected service (among others such as consumer key, timestamp, signature, etc).

Transparently supporting a secure authentication and authorization of different third-party services through the SAS's OAuth interface requires extending the OAuth protocol. This allows the SAS to act as a "secure proxy" for various other authentication protocols. To do so, the SAS needs at least the URL and the authentication type of the target service. Since this information is available in the activity specification and the security extension in a Bite workflow (e.g., FIG. 4, lines 18-23), it just needs to be sent to the SAS to enable transparent third-party service authentication. Thus, a number of request parameters are added when the Bite engine requests a request token at the SAS as discussed below.

HTTP Basic Authentication is widely used in practice although it is not very secure unless using SSL. It can be specified in Bite by setting the authtype to http basic (cf., FIG. 4, line 22). At runtime, the Bite engine contacts the SAS by requesting a request token by sending the following extended OAuth request:

```
http://sas.watson.ibm.com/request_token?oauth_consumer_key=
bite_app &oauth_timestamp=...&oauth_signature=...&oauth_...=... &x-
oauth_serviceurl=http://internal.acme.com/interview/schedule
&x-oauth_authtype=http_basic
```

The parameters x-oauth_serviceurl and x-oauth_authtype indicate the target URL of the secured third-party service and its authentication type from the scheduleInterview activity from FIG. 4 (the extension is prefixed with x- because this is a common pattern for HTTP header extensions too). In case of a synchronous authentication the user is redirected to the SAS Web interface, otherwise (in the asynchronous case) the user id specified in the notificationReceiver attribute receives a link that is used for authentication (basically the same that Bite redirects to in the synchronous case).

These two extension attributes are used by the SAS to make an outgoing call to the target URL in an iframe. It prompts the user for the credentials of the target service. If the authentication is successful, the HTTP Authorization header of the target service is intercepted by the SAS's proxying mechanism. A simple proxy servlet (/proxy) is used to achieve the proxying transparently at the SAS. The response of the target service is queued at the SAS, otherwise we would call the service twice: once for the authentication and once for the original service invocation. When the first "real" service invocation is executed, the SAS will return the queued response during the authentication process.

Support for custom application IDs requires adding another OAuth extension parameter called x-oauth_appid_mapping, that encodes details on how application IDs are queried from the user in a dynamically rendered Web form at the SAS and how this data is sent to the target service (e.g., in the HTTP header or as GET or POST parameter). Therefore, the security extension element in the Bite workflow defines a mapping element (FIG. 4, lines 31-36). More specifically, this mapping states that the target service has two parameters for a successful authentication, par and key, that need to be added as HTTP POST parameters (because this extension activity internally uses POST). Additionally, each element defines a label attribute used as a label for the HTML input element in the dynamically rendered authentication form.

Upon execution of such an application ID based service, the Bite engine serializes the Bite XML mapping into a simple text based form that is transferred to the SAS using the aforementioned OAuth extensions. Then the dynamically rendered authentication form is shown to prompt for the application IDs.

Support for OAuth is also transparently supported by the SAS. In this case, the SAS just adds another layer of redirection between Bite and the target service provider without storing any information. It would be possible to implement a customized security handler to consume OAuth-based services directly (because Bite is already an OAuth consumer for the SAS). However, going through the SAS when consuming OAuth-based services has the advantage of handling multiple security mechanisms transparently for the Bite engine.

Bite and the SAS have been implemented in Java 1.6. Bite can be run on either a servlet container or WebShpere sMash server. The SAS implementation is based on Google's Java OAuth implementation providing multiple servlets for the different endpoints (request token, access tokens, etc). These servlets have been extended to support the above mentioned security protocols transparently. The Bite engine implements the OAuth client by using a specific security handler upon calling services from an activity with a security element (SASSecurityHandler). All other calls use a NullSecurityHandler that does not involve the SAS.

Figure 7A:
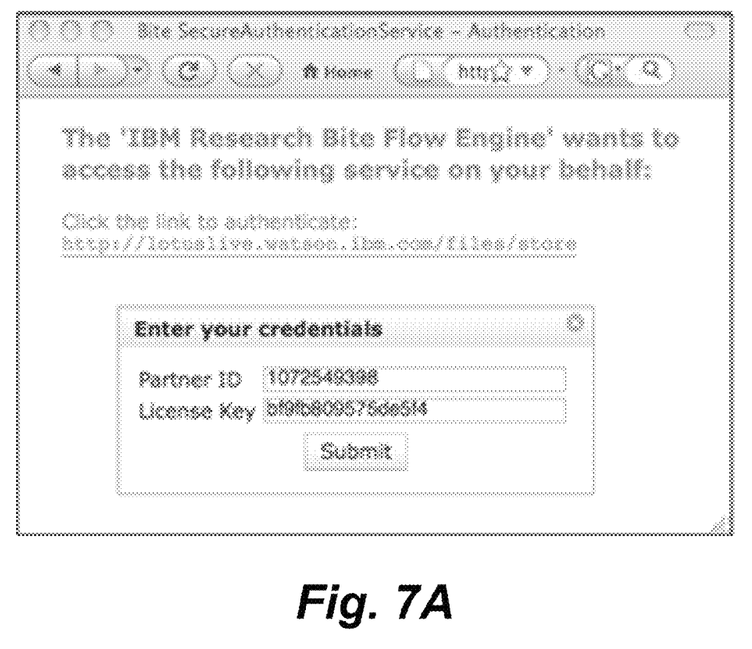
FIG. 7A is an example web page of a user's browser when redirected to a Secure Authorization Service (SAS) from the example scenario in FIG. 3.
Figure 7B:
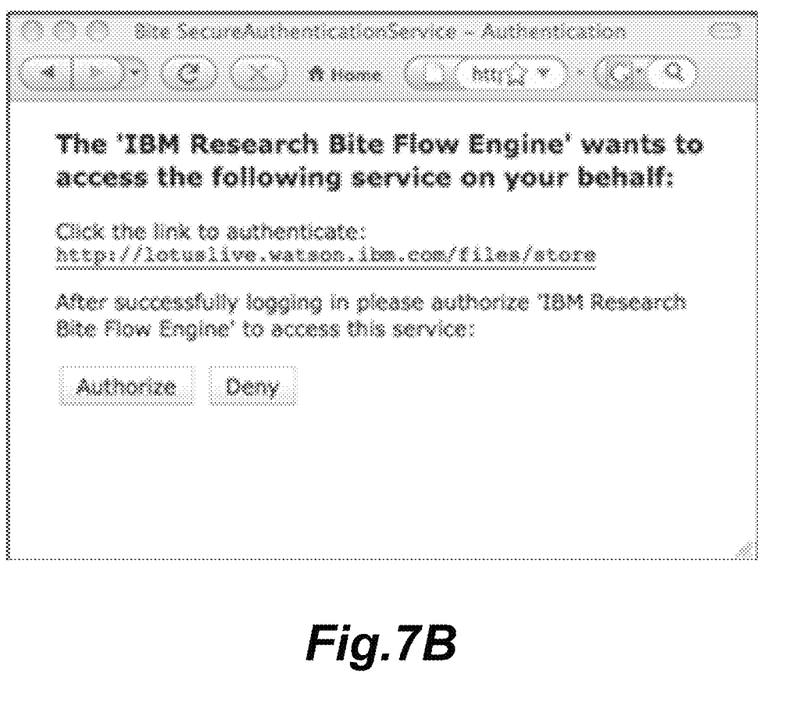
FIG. 7B is an example authorization web page of a user's browser from the example scenario in FIG. 3.

FIG. 7A is an example web page of a user's browser when redirected to the SAS from the example scenario in FIG. 3. FIG. 7B is an example authorization web page of a user's browser from the example scenario in FIG. 3. FIGS. 7A and 7B illustrate the SAS's Web interface for the authentication and authorization for the shareFile activity from FIG. 4 (lines 28-37) that uses custom application IDs as the "security" mechanism. FIG. 7A shows the dynamically rendered authentication form based on the specification in Bite. When the user's browser is redirected to the SAS, the user sees the Web page as shown. By clicking on the link, the authentication box pops up and the user enters the credentials. After submitting the credentials, the user explicitly has to authorize Bite to call the service on its behalf (FIG. 7B). When the user authorizes Bite, the workflow proceeds with its execution and the user is redirected back to the workflow application (in the synchronous case), otherwise an error is thrown. The same user experience is available for HTTP Basic authentication, however, the dialog box is not dynamically rendered but browser-specific.

The proposed approach based on the SAS effectively supports both, authentication and authorization of third-party services without the need to disclose the credentials to consumer applications (such as Bite in our case).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

What is claimed is:

1. A method for accessing data, the method comprising:
receiving a workflow model described in a workflow language and declaring security requirements of a composite application integrating protected data from two or more external network resources, the composite application executing on at least one host server computer according to the workflow model;
executing an authentication service on at least one secure server computer, the authentication service configured to conduct user authentication and authorization to access the protected data at the external network resources on behalf of the composite application; and
obtaining a set of user credentials through the authentication service, the set of user credentials stored in at least one security handler for use during a workflow instance of the workflow model.

2. The method for accessing data of claim 1, wherein the secure server computer is controlled by an entity trusted by the user.

3. The method for accessing data of claim 1, wherein the workflow language is an extensible workflow language.

4. The method for accessing data of claim 1, further comprising retrieving protocol information about one of the two or more external network resources.

5. The method for accessing data of claim 1, further comprising connecting to the authentication service from the composite application.

6. The method for accessing data of claim 1, further comprising connecting to one of the two or more external network resources from the authentication service.

7. The method for accessing data of claim 1, further comprising:
obtaining the user credentials by the authentication service; and using the user credentials to conduct the user authentication and authorization to access the protected data at the external network resources.

8. A system for accessing data, the system comprising:
at least one secure server computer;
a workflow model described in a workflow language configured to declare security requirements of a composite application integrating protected data from two or more external network resources, the composite application executing on at least one host server computer according to the workflow language;
an authentication service executing on the at least one secure server computer, the authentication service configured to conduct user authentication and authorization to access the protected data at the external network resources on behalf of the composite application; and
a set of user credentials obtained through the authentication service and stored in at least one security handler for use during a workflow instance of the workflow model.

9. The system for accessing data of claim 8, wherein the user credentials are stored at the authentication service.

10. The system for accessing data of claim 8, wherein the composite application further comprises:
the at least one security handler communicates with the authentication service, the security handler is configured to communicate with the authentication service using a security protocol.

11. The system for accessing data of claim 10, wherein the security protocol is OAuth.

12. The system for accessing data of claim 10, wherein the security protocol is HTTP Basic Authentication.

13. The system for accessing data of claim 10, wherein the workflow instance maintains its state of execution when the composite application communicates with the authentication service.

14. A computer program product comprising:
a non-transitory computer readable storage medium having computer readable program code embodied therewith, the computer readable program code configured to:
receive a workflow model described in a workflow language configured to declare security requirements of a composite application integrating protected data from two or more external network resources;
issue a request to an authentication service executing on at least one secure server computer to perform user authentication and authorization to access the protected data at the external network resources on behalf of the composite application according to the workflow language; and
obtain a set of user credentials through the authentication service, the set of user credentials stored in at least one security handler for use during a workflow instance of the workflow model.

15. The computer program product of claim 14, wherein the request to the authentication service redirects a user from the composite application to the authentication service to request the user credentials.

16. The computer program product of claim 14, wherein the computer readable program code is further configured to contact a user through an asynchronous messaging service.

17. The computer program product of claim 16, wherein the asynchronous messaging service is electronic mail.

18. The computer program product of claim 16, wherein the asynchronous messaging service is an instant messaging service.

19. The computer program product of claim 14, wherein the computer readable program code is further configured to receive the protected data from the authentication service.

* * * * *